United States Patent

Brady et al.

[11] Patent Number: 4,566,200
[45] Date of Patent: Jan. 28, 1986

[54] LONG RULERS

[76] Inventors: Leon Brady; George Spector, both of 233 Broadway Rm 3615, New York, N.Y. 10007

[21] Appl. No.: 671,996
[22] Filed: Nov. 16, 1984
[51] Int. Cl.[4] .............................................. G01B 3/08
[52] U.S. Cl. ...................................... 33/161; 33/458; 33/452
[58] Field of Search ................ 33/161, 458, 452, 460, 33/461, 462, 464

[56] References Cited

U.S. PATENT DOCUMENTS

| | | | |
|---|---|---|---|
| 596,896 | 1/1898 | Massa | 33/161 |
| 893,035 | 7/1908 | Turner | 33/161 |
| 1,081,995 | 12/1913 | Voggenreiter | 33/161 |
| 1,349,349 | 8/1920 | Thiman | 33/452 |
| 1,985,527 | 12/1934 | Taylor | 33/161 |

FOREIGN PATENT DOCUMENTS 670737  8/1929  France .................................. 33/161

Primary Examiner—Willis Little

[57] ABSTRACT

A folding extension ruler is provided and consists of a device for extending each arm of the ruler to twice its length from middle of the arm, a device for locking each arm in its fully extended position and appropriate measuring indicia located on each arm and extending device.

4 Claims, 5 Drawing Figures

LONG RULERS

BACKGROUND OF THE INVENTION

The instant invention relates generally to rulers and more specifically it relates to a folding extension ruler.

Numerous rulers have been provided in prior art that are adapted to measure various objects. For example U.S. Pat. Nos. 1,515,055; 1,608,713 and 2,842,850 all are illustrative of such prior art. While these units may be suitable for the particular purpose to which they address, they would not be as suitable for the purposes of the present invention as heretofore described.

SUMMARY OF THE INVENTION

A principle object of the present invention is to provide a folding extension ruler that is constructed to be extensible and collapsible from a six foot/seventy two inch length to a twelve foot/one hundred forty four inch length.

Another object is to provide a folding extension ruler that has arms which will extend from the middle to twice their length.

An additional object is to provide a folding extension ruler that contains appropriate measuring indicia located on each extensible arm.

A further object is to provide a folding extension ruler that is simple and easy to use.

A still further object is to provide a folding extension ruler that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
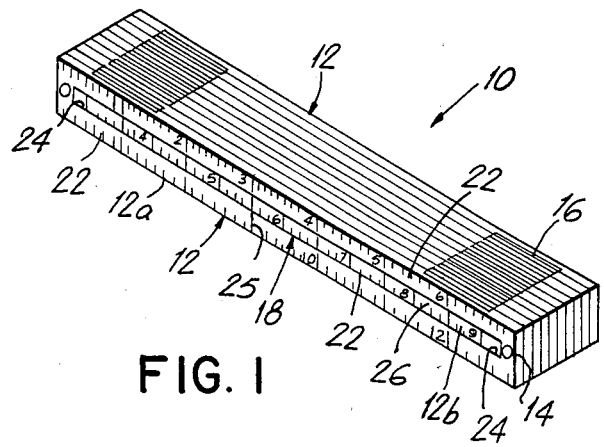
FIG. 1 is a perspective view of the invention.
Figure 2:
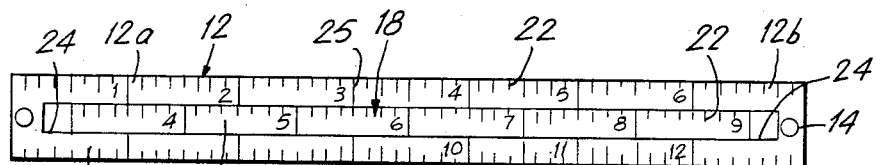
FIG. 2 is a front elevational view of one of the arms thereof.
Figure 3:
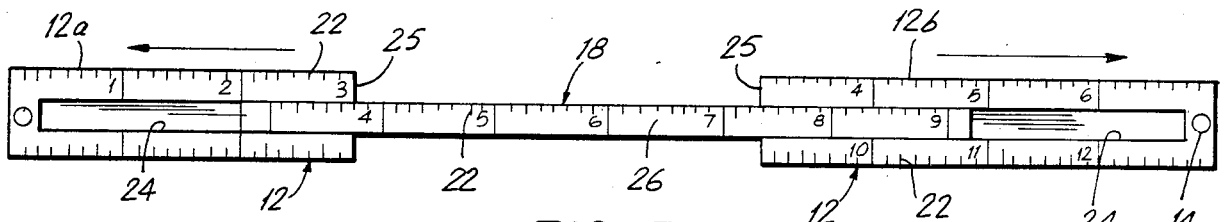
FIG. 3 is a front elevational view of one of the arms being opened in an exploded position.
Figure 4:
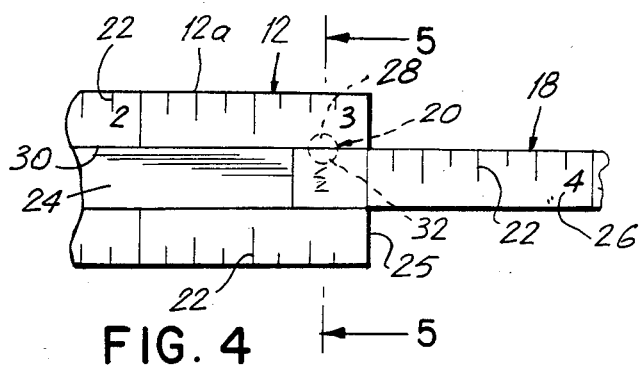
FIG. 4 is an enlarged partial elevational view of one of the arms completely opened in an extended locked position.
Figure 5:
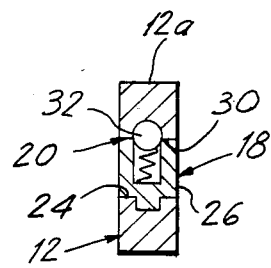
FIG. 5 is a cross sectional view taken along line 5—5 in FIG. 4 showing the locking mechanism therein.

Turning now descriptively to the drawings, in which similar reference characters denote similar elements throughout the several views, FIGS. 1 through 5 illustrates a folding extension ruler 10 that consists of a plurality of arms 12. Each arm 12 has a hinge 14 and a joint 16 at each end so that the arms 12 can be foldably attached together. A device 18 is provided for extending each arm 12 to twice its length from middle of the arm. A device 20 is also provided for locking each arm 12 in its fully extended position. Appropriate measuring indicia 22 is located on each arm 12 and the extending device 18.

The device 18 consists of the arm 12 having a longitudinal slot 24 therein. The arm is split vertically down the middle at 25 thus forming two halves 12a, 12b. An extension slide 26 engages the slot 24 in each half of the arm 12 so that the arm can extend to twice its length from middle 25 of the arm.

The device 20 consists of each arm 12 has two sockets 28. Each socket 28 is in side 30 of the slot 24 adjacent to the split 25 in each half 12a, 12b of the arm 12. Two spring loaded ball detents 32 are also provided. Each ball detent 32 is at each end of the extension slide 26 to engage each socket 28 in the slot 24 when the arm 12 is in its fully extended position.

The appropriate measuring indicia 22 consists of a sequence numbered scale such as inches, metric, etc. on each arm 12 and each extension slide 26. The ruler 10 is fabricated from durable material such as wood, plastic, aluminum, etc. When the ruler 10 is completely extended it can go from six foot/seventy two inches to twelve foot/one hundred forth four inches.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A folding extension ruler which comprises:
   (a) a plurality of arms, each said arm having a hinge and a joint at each end so that said arms can be foldably attached together;
   (b) means for extending each said arm to twice its length from middle of said arm;
   (c) means for locking each said arm in its fully extended position; and
   (d) appropriate measuring indicia located on each said arm and said extending means, wherein said means for extending each said arm to twice its length from middle of said arm comprises:
   (a) said arm having a longitudinal slot therein said arm split vertically down the middle thus forming two halves; and
   (b) an extension slide to engage said slot in each said half of said arm so that said arm can extend to twice its length from middle of said arm.

2. A folding extension ruler as recited in claim 1, wherein said means for locking each said arm is in its fully extended position comprises:
   (a) each said arm having two sockets, each said socket in side of said slot adjacent to said split in each of said half of said arm;
   (b) two spring loaded ball detents, each said ball detent at each end of said extension slide to engage each said socket in said slot when said arm is in its fully extended position.

3. A folding extension ruler as recited in claim 2, wherein said appropriate measuring indicia comprises a sequence numbered scale on each said arm and each said extension side.

4. A folding extension ruler as recited in claim 3, wherein said ruler is fabricated from durable material.

* * * * *